Nov. 8, 1966  J. C. LITTLE  3,283,492
DEAD END
Filed Feb. 12, 1965  2 Sheets-Sheet 1
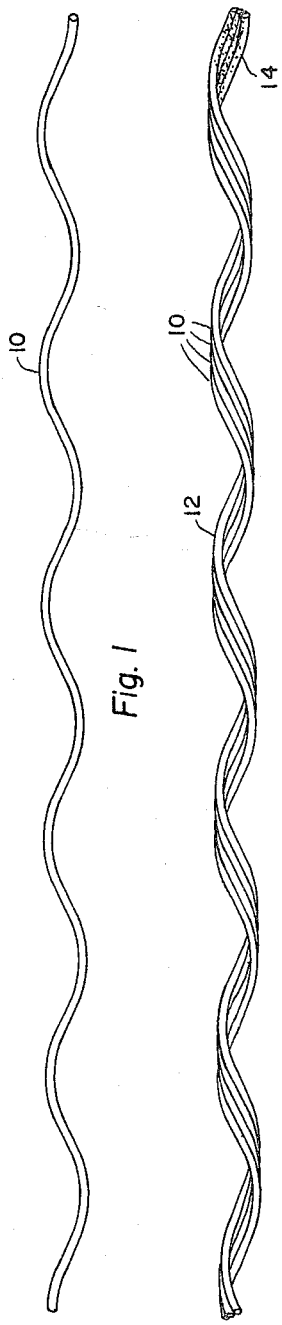
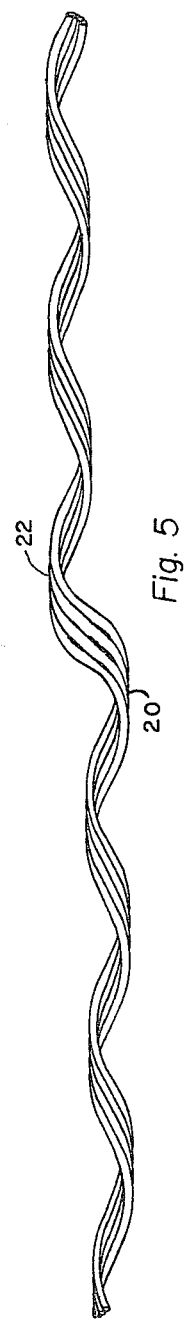
INVENTOR.
Jess C Little
BY J. D. Douglas
his atty

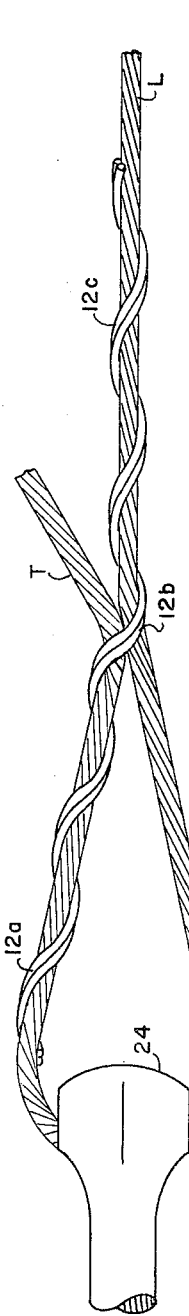
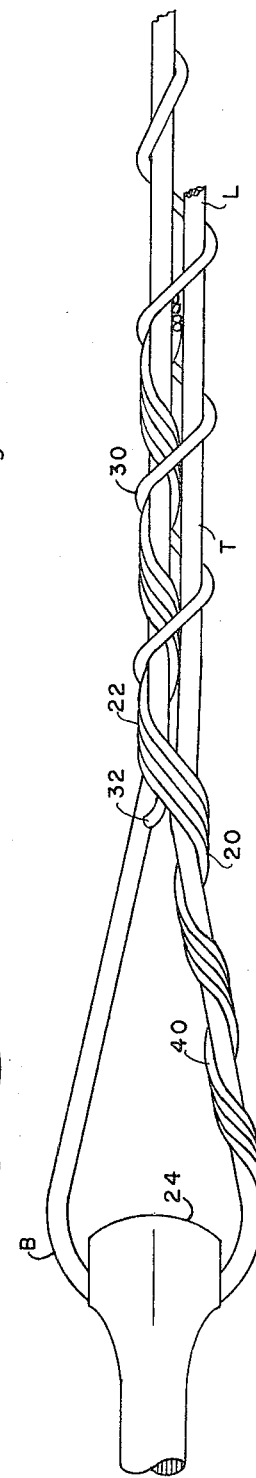
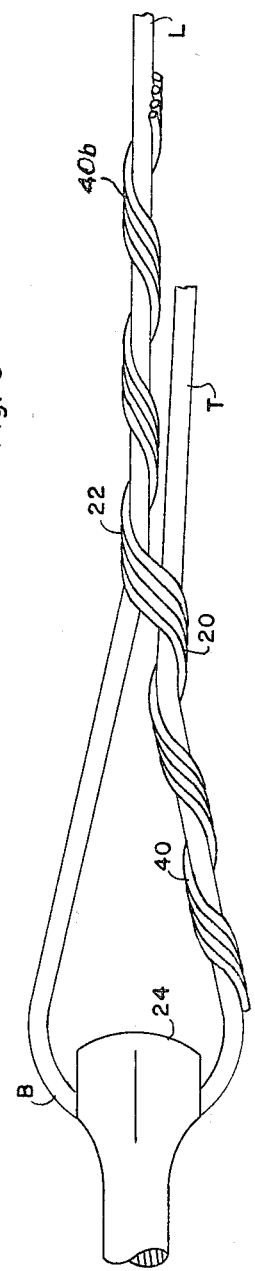

United States Patent Office 3,283,492
Patented Nov. 8, 1966

3,283,492
DEAD END
Jess C. Little, Cleveland Heights, Ohio, assignor to The Fanner Manufacturing Company, a division of Textron Inc., Cleveland, Ohio, a corporation of Rhode Island
Filed Feb. 12, 1965, Ser. No. 432,364
9 Claims. (Cl. 57—145)

This invention relates to improvements in line securing means and more particularly to an improved means for dead-ending a line. It is an improvement over that shown in my Patent No. 3,132,468, of May 12, 1964.

In the past it has been common practice to provide a means of dead-ending a line. The line to be dead-ended may be an electrical transmission line, a guy wire or any kind of a line that has to be secured at its end. Throughout the specification and claims the term "line" will be used and is intended to include all of the above. Previously, the common way to make a dead end was to pass the line around or through a support to provide a bight in engagement with the support and to then clamp the tail end of the line to the main line with suitable clamping means. The clamping means could be of the "mousing" variety as shown in Patent No. 2,405,270, or a pair of cleats which were held in clamping engagement with the line parts by suitable bolts, as is well known in the art.

Subsequent to the above there came into use dead ends that were made by preforming wires into helical elements which were then bent into hairpin shape to provide a bight which was inserted around or through the support means and a pair of legs which were wrapped around the ends of the line. Such a device is shown in Peterson Patent No. 2,761,273.

Another means contemplated passing the wire around or through a support and then securing the tail of the line to the main line in spaced relation thereto as shown in the Payer Patent No. 3,048,003.

The "mousing" and cleat type means for making dead ends was time-consuming and in the case of the cleats more expensive. The "mousing" type had to be applied by persons with considerable experience, and, in time, due to line vibrations, had a tendency to loosen up. The cleats had a tendency to nick the line, causing premature failure. The dead end made from the helical wires and bent back upon itself was difficult to apply and the exact amount of tension that was placed on the line was difficult to control because of its manner of application. Furthermore, it lacked the desired strength. In the above devices, with the exception of Payer, it was time-consuming and difficult to remove the devices when the line was retensioned.

The present invention contemplates an improved device, which may be easily applied and removed from a line; requires fewer elements to be put on the line and provides a superior strength and is economical. Furthermore, it can be applied by persons having a minimum of skill and the application is uniform. In addition, the exact desired tension may be applied to the line.

Still other advantages of the invention and the invention itself will become more apparent from the following description of an embodiment thereof which is illustrated by the accompanying drawings and forms a part of this specification.

In the drawings:

FIG. 1 is a side elevational view of a rod or wire formed for use in the invention;

FIG. 2 is an end view thereof;

FIG. 3 is an assembly of four of the wires of FIG. 1, where the wires have been intertwisted without bending;

FIG. 4 is a view of two wires, which have been intertwisted in the same manner and then the helix enlarged and the pitch shortened in the mid-portion;

FIG. 5 is a view of four wires assembled by intertwisting and with the mid-portion enlarged, the pitch shortened, and the helices offset;

FIG. 6 is a view showing the wires, such as illustrated in FIG. 4, applied to a line to make a dead end;

FIG. 7 is a view of a dead end made from the wires of FIG. 5; and

FIG. 8 is a view similar to FIG. 7 of another modification thereof.

Briefly, the invention contemplates the formation of one or more wires into a helix and then using one or more wires as clamp rods to secure a line which has been bent back upon itself and passed around or through a support. The clamp rods hold the "tail" end of the line in close proximity to the main line which is effected by wrapping the wire or wires around the tail part of the bight, then wrapping of the main line and tail part simultaneously for a partial wrap, and then wrapping the other end of the wire or wires around the main line. Additional means may be used to hold the tail when desired.

More specifically, as shown in FIG. 1, a wire or rod 10 of hard drawn resilient material is formed into a helix having an open pitch, which may be, and preferably is, less than the pitch of the line and can be in the same or opposite direction of lay to that of the line. It has an inside diameter of the helix that is less than that of the line. The above noted parameters are such that the helix may be applied to the line from its side without permanent deformation and, when applied to the line, provides a gripping engagement with the line.

One or more of the rods 10 may be used to carry out the invention, the number of rods used depending upon the character of the line being dead-ended. In the case of a "service drop" where the line is short and not heavy, one may be used. When used for dead-ending guys or long and heavy lines, more than one may be used.

In its preferred form, the rods may be assembled into groups of two or more rods, as shown in FIG. 3. This is effected by intertwisting the rods with each other to provide an assembly of two or more rods, as shown at 12 in FIG. 3. The rods so assembled are then coated with a suitable adhesive or cement to cause them to retain their assembled relation and when so assembled the assembly is in effect a helical ribbon. It is preferred that the interior of the helices have a suitable abrasive material, such as silica sand, as shown at 14 on the right end of FIG. 3. This can be applied throughout the length of the element. This can be effected by dusting the material on the interior before the adhesive or cement has set. It is contemplated that the element so assembled may be provided with a suitable protective coating when desired. This coating may be of an electrically insulating or conductive material.

It is pointed out that the helices shown in FIGS. 1 and 3 are of constant pitch and diameter throughout their length but that in certain instances it may be desirable to change the inner diameter and pitch length for one or a part of a helical convolution, or pitch length, as shown in the modification in FIG. 4. In this instance, where two rods are illustrated, the inner diameter of the helix has been enlarged between the points 16 and 18 and since this had been done after the initial formation of the helix, which ordinarily had substantially constant pitch throughout its length, the pitch length of that portion of the helix, between 16 and 18, is shortened. The purpose of this will hereinafter appear. It is pointed out that the pitch length of this portion could be the same as or even longer than the pitch length of the other convolutions, but that the structure disclosed is preferred.

Another modification of the basic elements is shown in FIG. 5, which incidentally shows four rods, wherein the enlargement in diameter and the shortening of the pitch between the points 20–22 is accompanied by an offsetting of the axes of the helical end portions.

The manner in which the basic elements are used is best shown in FIGS. 6 and 7. With reference to FIG. 6, there is shown in fragment the end of an anchor rod 24, which has the usual opening therein through which the end of a line L may be threaded. Althouh a simple anchor rod is illustrated, in order to simplify the drawings, the support could be any of the other well known supports, including insulators and the like or in some instances the line could be carried completely around the pole. In any event, the line is doubled back upon itself to provide a loop or bight B and the tail T brought into close proximity to the main line. This is effected by the use of the usual comealong, one end of which is attached to the main line and the other end attached to the tail, after the bight is formed by passing it around or through the support, and the comealong operated to apply the desired degree of tension to the line.

With the line so rigged, the next thing to do is to secure the tail to the main line which is done by taking any of the elements of FIGS. 1, 3, 4 or 5 and wrapping one of the helical ends 12a around the tail of the bight, as shown in FIG. 6. Then, if the rods which are of constant pitch and diameter are used, the fastening element is moved over and around the line at 12b. This causes a distortion of the rods, which are sufficiently resilient to enable the distortion, and at the place where the rods leave the tail T and go over to the main line L, the inner diameter is enlarged to substantially twice the diameter of the line and of a steeper pitch. The remaining end 12c of the helical element is then wrapped around the main line. The comealong may then be released. In FIG. 6 the clamp rods are illustrated as having a pitch direction which is opposite to that of the line. It is contemplated, however, that in most instances it will be desirable to make the pitch direction the same as that of the line. The line may be an insulated line.

One of the advantages of the structure is that the amount of tension placed upon the line may be more exactly determined. Another advantage is that it may be assembled with the line without the use of special tools other than the comealong and by persons with a minimum of experience and that they are uniform. When the line is not under tension even the comealong may be eliminated.

Once applied to the line, it has the advantage that it is stronger than the main line because the strain on the bight is distributed between the two line parts of the bight.

A further and unobvious advantage resides in the fact that as tension on the line is increased, as it will with a decrease in temperature, the points where the tail is engaged with the line is pulled into tighter engagement with the line, increasing its holding power. The line may partake of vibration which is absorbed by the part 12b, decreasing the amount of working realized in the eye of the anchor rod.

Another particular advantage of the improved structure resides in the fact that the tail T may be left as long as desired. Lines frequently require retensioning, and the above embodiment enables a comealong to be attached to the tail and the line while the clamp element is in place, tension applied and the clamp was removed, the proper tension placed on the line and the clamp was replaced.

Although in the heavier duty installation the rods are intertwisted to form an element of more than one rod, it is contemplated that the rods could be assembled by attaching them to the bight and line singly.

As was stated, the securing element may be made of 1, 2 or more rods of constant pitch and diameter throughout its length and the distortion occurs at 12b when it is applied. Thus, under the lighter service requirements, lighter rods may be used. In the case where the service requirements are of a heavier nature, heavier rods may be used and in this instance the mid-portion of the rods may be permanently distorted at 16–18, as described. The amount of the predistortion will be dependent upon the size of the line, usually this is slightly less than the combined diameter of the line and tail, bearing in mind that it is desirable that there be some definite frictional contact between the line and the tail, behind the part 12b of the clamping member. This distortion enables the element to be secured to the line easier because there is no need for the helix to be distorted and because it is difficult to distort, particularly where the heavier rods are used.

FIG. 7 shows an installation where the element of FIG. 5 is used. This is particularly useful on the heavier lines. In this instance, the helical end 40 is wrapped around the two juxtaposed parts and finally the other end 40b is wrapped around the line. Although the tail T is shown as separated from the main line, the degree of separation may be varied between that where there is no separation (as in FIG. 6) and that where the separation is approximately that of the thickness of the rods which form the element. The offsetting of the end portions provides a neat appearance and improved action because the tail can extend alongside and in closely spaced parallel relation to the main line, thus preventing engagement with objects which come in proximity thereto. In the heavier lines, the offsetting provides easier application. As in the other embodiments, when tension on the line increased, the tendency of the tail to move toward the anchor end of the bight and in the opposite direction to the main line causes the part 20–22 to decrease in diameter and force the two line parts more firmly together.

FIG. 8 illustrates another embodiment of the invention where the tail has been left considerably longer for the subsequent engagement with the comealong when retensioning is desired. In order to secure the tail to the line, a single helical rod 30 is used to lash the tail to the main line. The lashing rod can be of constant pitch and inner diameter throughout its length or it can have one or both ends as is shown at 32 formed to a pitch that is smaller than the line and have an enlarged inner diameter where it encompasses the two line parts. The direction of the pitch may be the same as that of the clamp rods or it may be in the opposite direction as shown. It will be noted that the character of the clamp element is such that there may be some distortion of the tail and line portion from the normal axes thereof.

Although only one clamping element is shown in FIGS. 6 to 8, it is contemplated that two such elements could be used and applied to the bight and line in such a manner that the helices of the two elements would be substantially 180° out-of-phase. In this instance, the parts such as 12b (FIG. 6) would pass around the tail and line on opposite sides.

Having thus described my invention in some embodiments thereof I am aware that numerous and extensive departures may be made therefrom without departing from the spirit or scope of the invention as defined in the appended claims.

I claim:

1. In combination with a line folded back upon itself to form a bight which is connected to a support, said bight comprising a loop and said folded back portion being a tail portion extending in proximity to the main line portion, means for holding a short part of said tail portion in contact with the main line and against movement in opposite direction to the movement of the main line, comprising a preformed resilient helical element the convolutions of which are of an open pitch and the pitch length being such that said element when applied to the line is not permanently deformed, the inner diameter of the element being less than the line, said element having one end portion wrapped around the portion of the bight on the tail side thereof and having a mid-portion of less than one pitch length wrapped around the combined tail and main line portions whereby the tail portion is held in contact with the line, said last wrapping causing a distortion of the element at the points where it surrounds the line to increase the inner diameter and reduce the pitch length, for resiliently holding said line parts in contact with each other, and the other portion of said element being wrapped around the main line.

2. A device as described in claim 1, wherein the tail portion extends for a sufficient length beyond the points where the tail and bight are mutually engaged to permit attachment of a line tensioning device.

3. A device as described in claim 1, wherein a lashing means is provided for holding the free end of the tail portion to the main line, said lashing means being a helical rod of resilient material having a pitch length such that it may be applied to the tail and main line portion simultaneously without permanent deformation.

4. A device as described in claim 1, wherein the helical element is formed of more than one wire.

5. A device as described in claim 4, wherein at least parts of the inner surface of the helical element are provided with a grip enhancing material.

6. A device as described in claim 4, wherein said helical element has the mid-portion predeformed to provide an inner diameter more than the diameter of the line and less than twice the diameter of the line.

7. A device as described in claim 6, wherein said enlarged portion is less than one pitch length long.

8. A device as described in claim 1, wherein said helical element has the mid-portion deformed to provide an inner diameter greater than the diameter of the line, and to provide end helix portions with the axes thereof offset relative to each other.

9. A device as described in claim 8, wherein said enlarged portion is less than one pitch length long.

References Cited by the Examiner
UNITED STATES PATENTS

| | | | |
|---|---|---|---|
| 2,998,696 | 9/1961 | Payer | 57—145 |
| 3,018,319 | 1/1962 | Quayle | 174—79 |
| 3,032,964 | 5/1962 | Peterson | 57—142 X |
| 3,080,631 | 3/1963 | Ruhlman | 57—145 X |
| 3,132,468 | 5/1964 | Little | 57—145 |
| 3,183,658 | 5/1965 | Peterson | 57—142 X |

FRANK J. COHEN, *Primary Examiner.*

D. E. WATKINS, *Assistant Examiner.*